(12) United States Patent
Kreitzer et al.

(10) Patent No.: US 7,993,551 B1
(45) Date of Patent: Aug. 9, 2011

(54) BYPASS COOLING REDUCTION ON HIGH PRESSURE DIE CAST MACHINES

(75) Inventors: James Kreitzer, Wapakoneta, OH (US);
Ron Maidon, Wapakoneta, OH (US);
Matthew Pettus, Botkins, OH (US);
Gary Prenger, Maria Stein, OH (US)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 12/325,671

(22) Filed: Dec. 1, 2008

(51) Int. Cl.
*B29C 47/92* (2006.01)

(52) U.S. Cl. .................. 264/40.6; 264/328.16

(58) Field of Classification Search ............ 264/328.16, 264/40.6; 164/451, 455, 458
See application file for complete search history.

(56) References Cited

U.S. PATENT DOCUMENTS

| | | |
|---|---|---|
| 1,491,173 A | 4/1924 | Schwartz |
| 4,354,812 A | 10/1982 | Wieder et al. |
| 4,976,305 A | 12/1990 | Tanaka et al. |
| 5,452,999 A | 9/1995 | Evans |
| 5,589,114 A | 12/1996 | Evans |
| 5,720,912 A | 2/1998 | Liehr et al. |
| 6,280,665 B1 | 8/2001 | Kotzab |
| 6,598,659 B1 | 7/2003 | Frulla |
| 6,763,879 B1 | 7/2004 | Macheske et al. |
| 6,991,756 B2 | 1/2006 | Saeki et al. |
| 7,001,546 B2 | 2/2006 | Dunk |
| 7,323,127 B2 | 1/2008 | Muranaka et al. |
| 2008/0308252 A1* | 12/2008 | Kirkman ................... 164/458 |

* cited by examiner

*Primary Examiner* — Christina Johnson
*Assistant Examiner* — Galen Hauth
(74) *Attorney, Agent, or Firm* — Rankin Hill & Clark LLP

(57) ABSTRACT

Within an improved method of maintaining a die during interruptions in production and of subsequently returning the die to an optimal operating temperature, instead of having a manual control valve in the bypass loop of cooling medium, a PLC controlled valve is provided which can automatically allow or stop the flowrate through the bypass loop. Instead of circulating cooling medium through the die continuously, and at a reduced rate, during the interruption, the cooling medium is not circulated at all initially during the interruption. When the restart of production is desired, the first two preheat shots produced are made without the circulation of any cooling medium through the die. The valve within the bypass loop is then opened to let some cooling medium circulate through the die, however the circulation rate is less than the rate associated with normal production. The bypass loop is then left open while the valve in the primary loop is reopened.

7 Claims, 4 Drawing Sheets

BYPASS COOLING REDUCTION ON HIGH PRESSURE DIE CAST MACHINES

BACKGROUND OF THE INVENTION

Many parts are produced by the method of die casting. In this method, molten material is added to a die and cooled to form the part. The die may be a one time use type or a reusable type. Often, reusable dies are provided with means for cooling the die. Especially when larger parts are produced, the associated die includes passages through which a cooling medium is passed. Cooling the die not only maintains the appropriate size and shape of the die during casting, but helps control the cooling rate of the cast part.

Cooling the die is an issue of heat balancing. Heat is provided by the molten material added to the die. Heat is removed by the cooling medium circulated through the die. Providing too much cooling through the die can result in the formation of inferior products because the molten material cannot effectively reach into all of the sections of the die. Additionally or alternatively, rapid cooling of the molten material can cause porosity or cracks in the finished part. On the other hand, if too much heat is provided, the die can expand and alter its shape, producing inferior parts. At extreme head loads, the die can crack or otherwise fail.

Although continuous operation of the die casting process is preferable, for various reasons production must be interrupted periodically. When this occurs, typically a valve which controls regular flow to the die in a principal cooling loop is closed and a bypass cooling loop is implemented. The bypass loop includes an adjustable manual valve and provides approximately one half the normal volume of cooling fluid to the die. When production is restarted, it is necessary to bring the die up to an appropriate temperature again. This is done by forming "preheat shots" within the die. These are castings which are discarded. In this process, molten material is poured into the die, thus heating the die, but the die is still too cold for these "preheat shots" to be considered parts meeting required quality standards. Typically, the formation of about six preheat shots is required to bring the die back to an acceptable temperature to produce parts meeting quality standards. As these "preheat shots" are considered to be scrap, a method to reduce the number required to be formed is desirable.

BRIEF SUMMARY OF THE INVENTION

The present invention provides an improved method of maintaining a die during interruptions in production and of subsequently returning the die to an optimal operating temperature. Instead of having only a manual control valve in a cooling medium bypass loop, a PLC controlled valve is provided which can completely stop flow automatically through the bypass loop. Instead of circulating cooling medium through the die continuously and at a reduced rate during a production interruption, the cooling medium is not circulated at all initially during interruptions.

When the restart of production is desired, at least the first two preheat shots are produced in the die without the circulation of any cooling medium through the die via the primary loop or bypass loop. The valve within the bypass loop is then fully opened to let some cooling medium circulate through the die, however the circulation rate is less than the rate associated with normal production. At least one additional preheat shot is formed with this reduced rate operating. The primary loop is then fully opened in combination with the open bypass loop. Control of the opening/closing of the primary and bypass cooling loops is controlled by automatic valves and PLC control.

This method reduces the number of preheat shots required to reheat the die from about six to about three depending on the size of parts being formed. This saves time and reduces the amount of scrap generated in the production process. These and other features, aspects and advantages of the present invention will be fully described by the following description, appended claims and accompanying drawings.

DETAILED DESCRIPTION OF THE INVENTION

Figure 3:
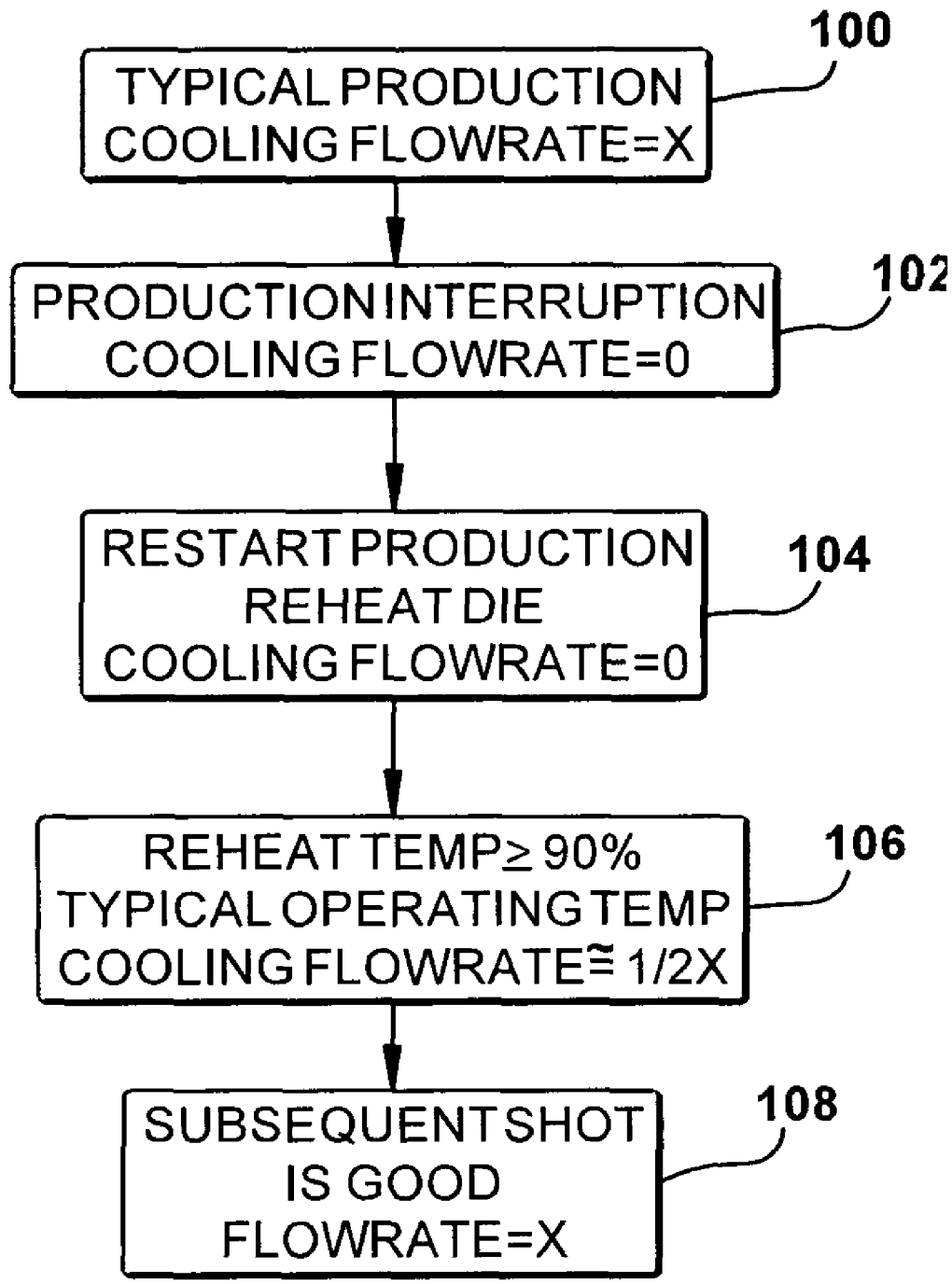
FIG. 3 is a flowchart of the process of the present invention.

Referring to the drawings, specifically FIG. 3, a preferred method for operating a casting device with cooling capabilities is shown. The method includes producing preheat shots after a production interruption wherein at least initially, no flow of cooling medium is provided through the die.

Figure 1:
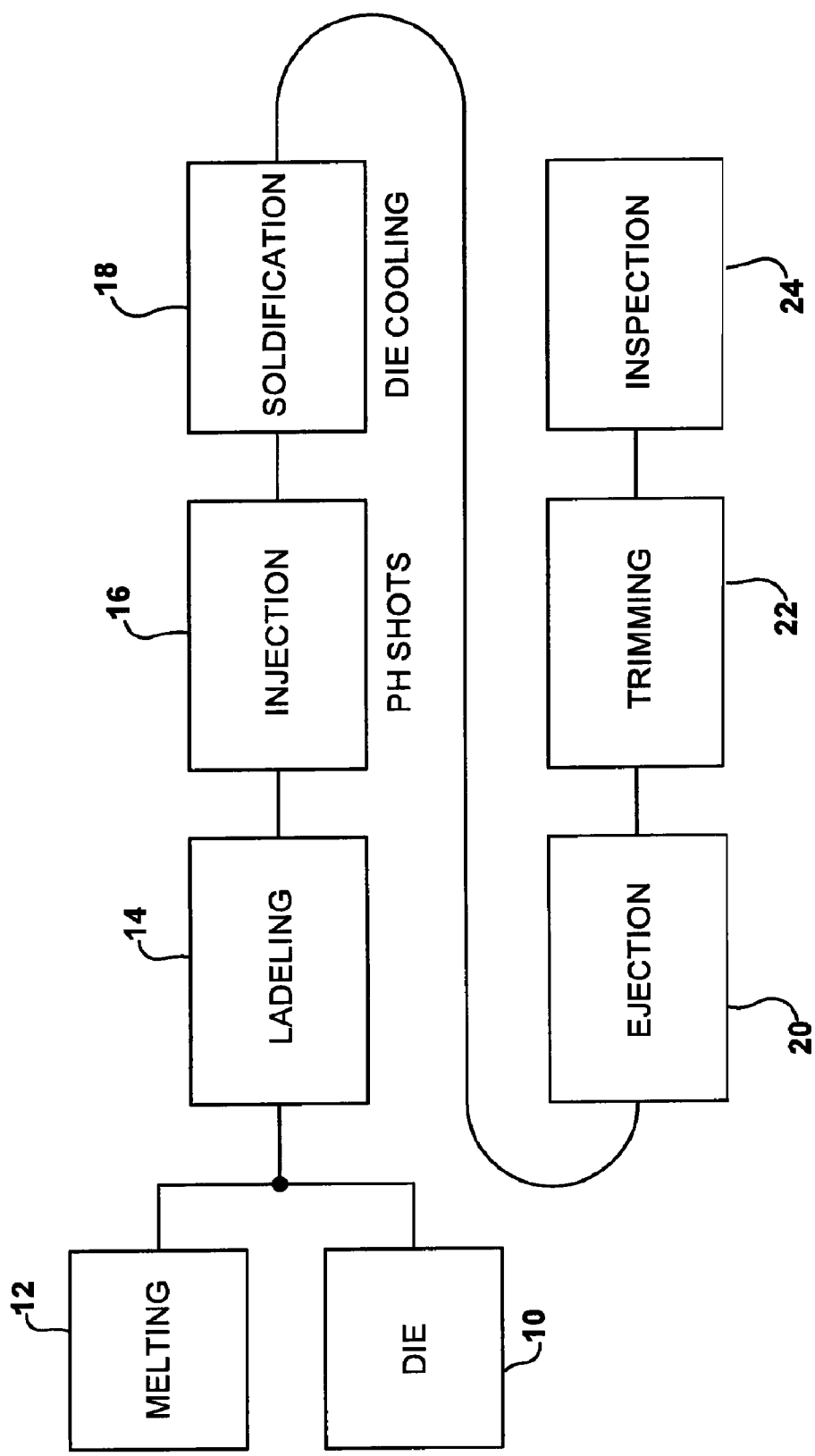
FIG. 1 is a flowchart of a typical die casting process.

FIG. 1 shows a typical casting process which includes providing a die 10, and a container for molten material 12 that is poured into the die in a ladling step 14. The poured molten material is injected 16, under pressure, deep into the die to form a shot (one or more castings). The shot is cooled 18 and then ejected from the die 20. The cast parts are then trimmed 22 of flashing, sprues, etc. and inspected 24 for quality.

Figure 2A:
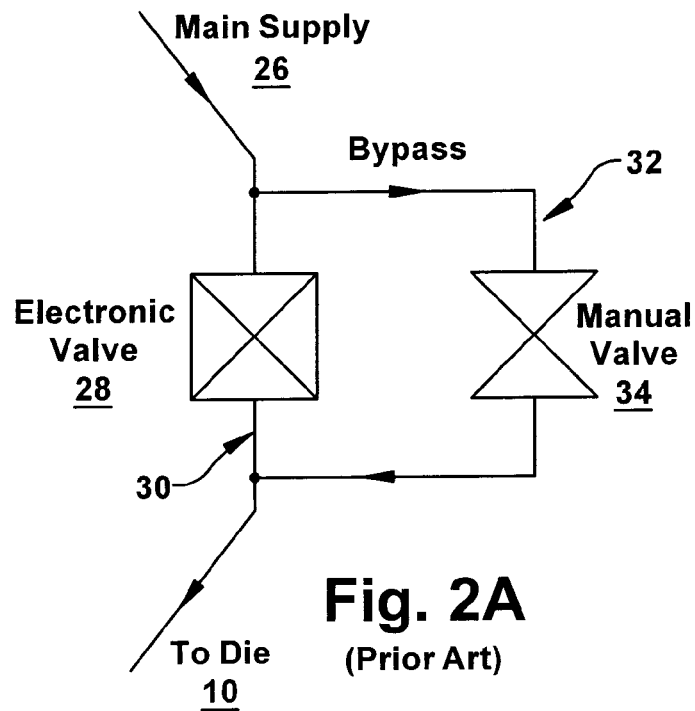
FIG. 2A is a schematic representation of prior art cooling loops for a die.
Figure 2B:
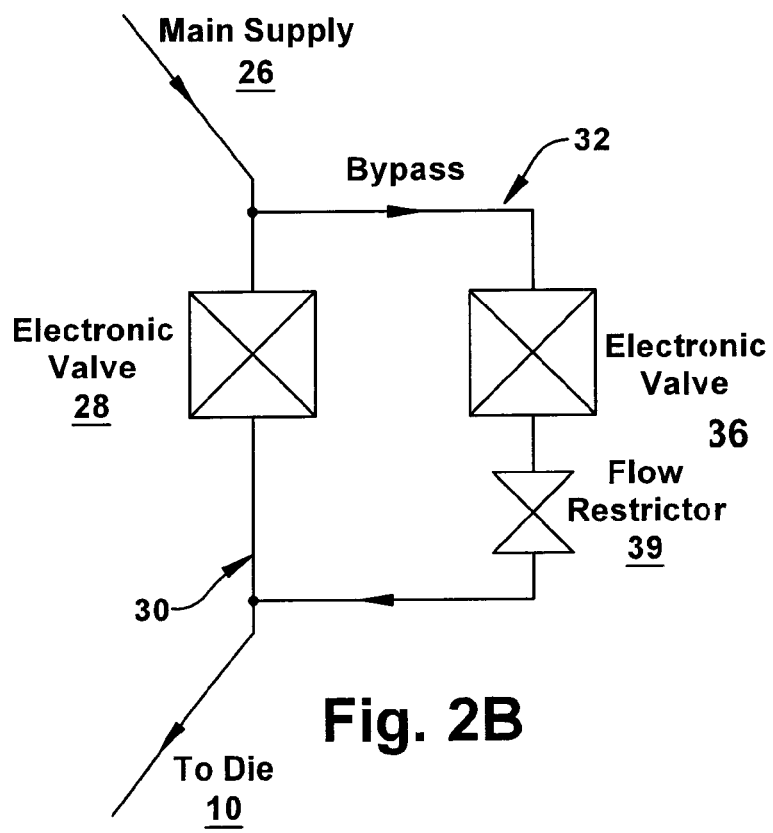
FIG. 2B is a schematic representation of cooling loops for the present invention.

FIGS. 2A and 2B show a typical cooling loop configuration and an alternate configuration, respectively, the alternative configuration used in the method of the present invention. In the typical configuration shown in FIG. 2A, a cooling medium is provided from a main supply 26, then passes through a main electronic valve 28 in a primary loop 30 and then to the die 10. The cooling medium passes through passages in the die 10 and then to a reservoir or other type of receptacle where the cooling medium is held. The cooling medium may be discarded or reused. If reused, the cooling medium may need to be cooled via a heat exchanger or other manner known in the art.

Still in the typical configuration shown in FIG. 2A, when the production process is interrupted, the electronic valve 28 is closed such that the cooling medium is directed through a bypass loop 32 before reaching the die 10. The bypass loop 32 includes a manual valve 34 which is set such that the flowrate through the bypass loop 32 is approximately one half of the flowrate through the primary loop 30 when the electronic valve 28 is open.

In the apparatus and method of the present invention, shown in FIG. 2B, the bypass loop 32 includes an electronic valve 36 that can be set in a fully open or fully closed position. The electronic valves 28, 36 in the primary and bypass loops are operated by a PLC controller (not illustrated). The PLC controller times the opening/closing of the valves based on what stage of the casting process is being performed. Preferably, changes to the valves are implemented during the injection portion 16 of the casting process.

Figure 4:
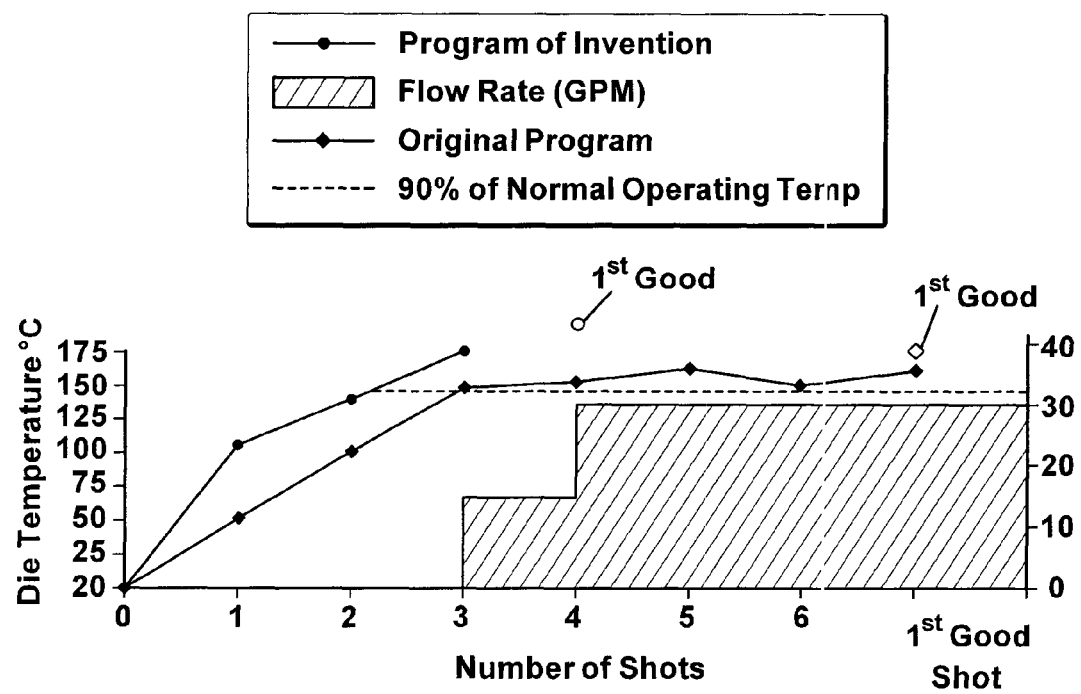
FIG. 4 is a graphical representation of a cooling program of the present invention.

Referring to FIGS. 2-4, a preferred method of operating a casting device is shown. In a normal production step 100, parts are cast as cooling medium is circulated through the die at a first flowrate. Preferably, the operating temperature of the die is between 150 and 175 C. A preferred flow rate through the die is about 30 gpm in normal production. Parts are cast in a manner similar to that previously described.

When production is interrupted 102 due to broken die parts, part removal difficulty, adjustments, etc., the first electronic valve 28 is shut off and the second electronic valve 36, in the bypass loop 32, shut off also. Thus, there is no flow to the die 10. Downtime is unpredictable and, thus, for this example the die temperature in FIG. 4 is shown as cooling all the way to a typical ambient temperature (20 C).

In the next step 104, production is restarted by forming a first "preheat shot" in the die 10. At this time there is still no flow of cooling medium through the die 10. The die 10 heats up to a much higher temperature as compared to prior practices (see indication of prior practice in FIG. 4; line with diamond shaped indicators) where some amount of cooling medium is continuously circulated through the die 10.

A second "preheat shot" is formed in the die 10, again without cooling medium being circulated through the die 10. In step 106, as a third "preheat shot" is being formed in the die 10 (the injection step) the electronic valve 36 is opened fully in the bypass loop 32. Opening of the valve preferably is triggered by the temperature of the die reaching a level that is 90% or more of the temperature of the die when operating during normal production. A flow restrictor 39 may be present within the bypass loop. As a result of the electronic valve 36 being opened, a flowrate of the cooling medium, which is less than the first flowrate during normal operation, is directed through the die 10. Preferably, the flow rate is about one half of the flow rate through the primary loop. The first three "preheat shots" formed will likely not be acceptable parts and need to be scrapped. As the fourth shot is being formed in step 108, the first electronic valve 28 is also opened, so the primary cooling loop 30 along with the bypass loop 32 both supply the die. The fourth shot and subsequent shots will result in the production of acceptable parts.

Beginning with the fourth shot, normal cooling flowrates are provided for formation of the remainder of the parts.

An alternative way to get partial flow through the valve in the bypass loop is to cycle the valve full open for part time and full closed for part time.

Ninety percent of average production temperature has been determined to be an appropriate transition temperature by production testing, however, this threshold can be changed.

The method is described as requiring the formation of three "preheat shots" in combination with the inventive manner of cooling the die. If the parts being formed are smaller than typical, an additional preheat shot with no flow going to the die may be required. Also, the amount of preheat shots may be reduced if the production interruption is so short that the die does not have time to cool to an ambient temperature.

The amount of scrap generated in the inventive method is reduced compared to prior methods. Also, because fewer "preheat shots" are required, there is less downtime when production is desired.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method for operating a casting device including a die with cooling passages therein, through which a cooling medium is passed, comprising the steps of:
   casting parts in a production process while circulating cooling medium through the die at a first flow rate;
   completely stopping the flow of cooling medium through the die when ceasing the production of parts due to a production interruption;
   restarting the production process and casting at least two parts completely and consecutively within the die without circulating cooling medium through the die;
   after casting the at least two parts within the die without circulating cooling medium through the die, casting the next at least one additional part completely within the die while circulating cooling medium through the die at a rate less than the first flow rate;
   after casting the at least one additional part within the die while circulating cooling medium through the die at a rate less than the first flow rate, casting yet a further part within the die while circulating cooling medium through the die at the first flow rate.

2. The method of claim 1 wherein cooling medium supplied at the first flow rate is supplied through a primary loop and a bypass loop.

3. The method of claim 2 wherein cooling medium supplied at a flow rate less than the first flow rate is supplied through a bypass loop only.

4. The method of claim 3, wherein cooling medium supplied at the first flow rate is supplied through a bypass loop and a primary loop.

5. The method of claim 3 wherein the primary loop and bypass loop each comprise an electronically controlled valve.

6. The method of claim 1, wherein when casting the at least one additional part, after casting the at least first two parts within the die without circulating cooling medium, the flow rate is maintained at about one half of the first flow rate.

7. The method of claim 1, wherein the additional part is cast when the die temperature is greater than 90%, but less than 100% of the normal operating temperature.

* * * * *